(12) United States Patent
Weir

(10) Patent No.: US 8,751,966 B2
(45) Date of Patent: Jun. 10, 2014

(54) DISPLAY OF FILTERED DATA VIA ORDERED VALUES

(75) Inventor: Jeffrey Weir, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 12/765,156

(22) Filed: Apr. 22, 2010

(65) Prior Publication Data

US 2011/0265032 A1 Oct. 27, 2011

(51) Int. Cl.
*G06F 3/048* (2013.01)

(52) U.S. Cl.
USPC ............ 715/833; 715/786; 715/788; 715/767

(58) Field of Classification Search
USPC .................................. 715/833, 786, 788, 767
See application file for complete search history.

(56) References Cited

U.S. PATENT DOCUMENTS

| | | | |
|---|---|---|---|
| 6,323,883 B1 | 11/2001 | Minoura et al. | |
| 6,686,939 B1 | 2/2004 | Haynes | |
| 6,966,037 B2 | 11/2005 | Fredriksson et al. | |
| 7,296,232 B1 | 11/2007 | Burdick et al. | |
| 7,496,857 B2 | 2/2009 | Stata et al. | |
| 2003/0009493 A1* | 1/2003 | Parker et al. | 707/500.1 |
| 2003/0171965 A1 | 9/2003 | Ratzlaff et al. | |
| 2005/0057584 A1 | 3/2005 | Gruen et al. | |
| 2006/0236269 A1 | 10/2006 | Borna | |
| 2007/0112732 A1* | 5/2007 | Clark et al. | 707/3 |
| 2007/0260503 A1 | 11/2007 | Pan et al. | |
| 2008/0192056 A1* | 8/2008 | Robertson et al. | 345/440 |
| 2009/0327921 A1* | 12/2009 | Holm-Peterson et al. | 715/753 |

OTHER PUBLICATIONS

Fehily, C., "Visual QuickStart Guide: Microsoft Windows 7", 2009, Peachpit Press, pp. 191-194, 218-225.*
Shuping, David., "Geo-Temporal Visualization of RFID", Retrieved at << http://www.locationintelligence.net/articles/1954.html >>, Sep. 29, 2005, pp. 4.
Garbarino, Damien., "IBM ILOG Elixir Blog—Adding a horizontal scroll bar to the Calendar", Retrieved at << https://www.ibm.com/developerworks/mydeveloperworks/blogs/elixir/entry/addingahorizontalscrollbartothecalendar?lang=en >>, Feb. 10, 2009, pp. 5.

* cited by examiner

*Primary Examiner* — Amy Ng
*Assistant Examiner* — Claudia Dragoescu
(74) *Attorney, Agent, or Firm* — Steven Spellman; Jim Ross; Micky Minhas

(57) ABSTRACT

Embodiments are disclosed that relate to display of filtered data via ordered values. One embodiment provides for filtering a collection of items via a range of ordered values associated with a rule user interface object. Upon receiving an adjustment to the rule interface object which changes the range, the collection is filtered to display selected items corresponding to that updated range. Further, based on a comparison between the updated range and a threshold, display of the rule may be updated to display values associated with a different granularity level.

20 Claims, 8 Drawing Sheets

DISPLAY OF FILTERED DATA VIA ORDERED VALUES

BACKGROUND

Sorting through large collections of data, such as catalogs of images, music data, video data, etc., can be tedious and time-consuming. Further, common user interface filtering tools may make it difficult to filter such collections of data based upon desired value ranges. For example, some filters allow a user to search a collection of time-valued items via a calendar object that allows a user to filter by selecting a date on the calendar. However, such filters may not enable a user to filter a collection based on a desired arbitrary range of time values, or based on time value units other than days. Since time values may correspond to various magnitudes (e.g., millennia, centuries, seconds, milliseconds, etc.), it may be particularly difficult to specify a time range on these orders.

SUMMARY

Various embodiments are disclosed herein that relate to display of filtered data comprising ordered values. For example, one disclosed embodiment provides a method comprising displaying, on a display, a rule user interface object corresponding to ordered values associated with a granularity level, where the rule user interface object comprises a first marker defining a first value and a second marker defining a second value, and where each of the first marker and the second marker are moveable to other positions along the rule user interface object to vary the first value and the second value. The method further comprises filtering the collection based on a range of ordered values defined between the first value and the second value to create a subset of the collection, where the subset comprises one or more selected items each having metadata corresponding to a value falling within the range of ordered values, and displaying the subset of selected items on a results portion of the display. The method further comprises receiving an adjustment to the rule user interface object changing one or more of the first value and the second value, and in response, updating the range of ordered values to create an updated range of ordered values based on the adjustment. The method further comprises determining a comparison between the updated range of ordered values and a threshold, and based on the comparison, updating display of the rule user interface object to display values associated with a different granularity level. The method further comprises filtering the collection based on the updated range of ordered values to create an updated subset of selected items, and displaying the updated subset of selected items on the results portion of the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, difficulties may be encountered in viewing and filtering large collections of data associated with ordered values, such as time values (e.g., day, week, month, etc.), distance values (e.g., centimeter, meter, kilometer, etc.), etc. For example, in a collection of electronic magazine issues, it may be difficult for a user to filter the collection for a desired arbitrary time range (e.g., all months where baseball was featured). Further yet, it may be difficult to efficiently switch to different ranges (e.g., from 2010, to January 2010, to 1990-2010, etc.) without manually entering several filter parameters.

Accordingly, various embodiments are disclosed herein that relate to display of filtered data via an adjustable rule user interface object. The disclosed rule user interface object embodiments allow a portion of the range of ordered values corresponding to the rule to be selected, and in response, a results portion of the display displays items corresponding to the selected values of the range. Thus, the rule can provide an intuitive user interface with which a user can efficiently filter a collection of items. Further, based on the adjustment made to the rule, the rule itself may automatically update to display a more suitable scale. As such, users can not only easily filter vast amounts of data, but they can do so in a visual manner, both in respect to display of the results as well as specifying filter parameters via the rule. In this way, a user can filter by arbitrary time ranges, modify the position of the time range, view/select neighboring time ranges, etc., as described in more detail as follows. It will be understood that ordered values may comprise numerical or non-numerical values. For example, a series of non-numerical quantities may be assigned a predefined ranking that may be used to display the quantities in a desired order. Further, ordered values may be contiguous (e.g., 3, 4, 5, 6) or non-contiguous (e.g., JAN, MAR, JUL, SEP).

Figure 1:
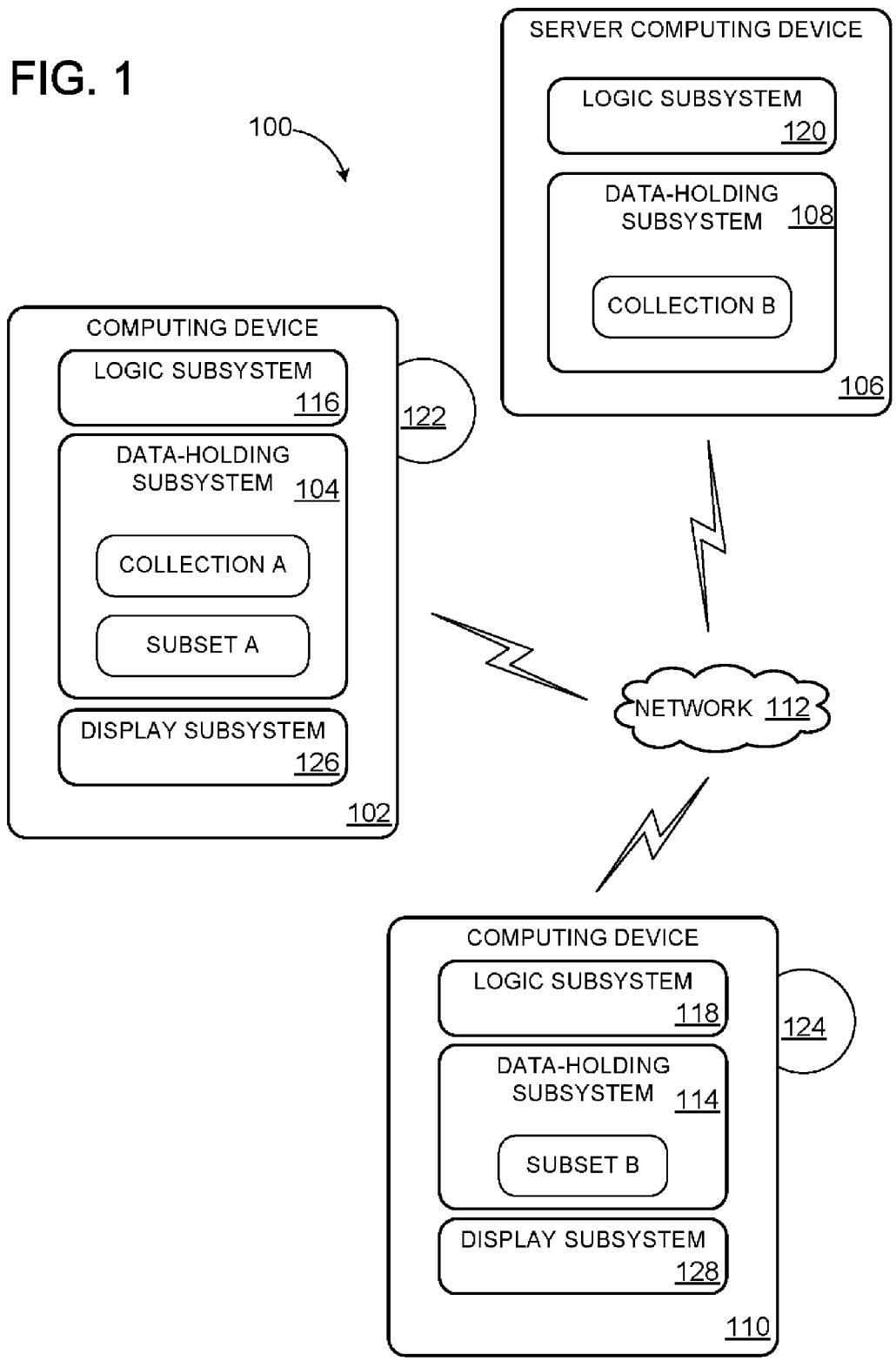
FIG. 1 shows a block diagram of an example embodiment of a use environment for filtering a collection of items in accordance with an embodiment of the present disclosure.

FIG. 1 shows an embodiment of an example use environment 100 for filtering a collection of items in accordance with the present disclosure. Such items may be any suitable type of item comprising associated metadata with ordered values (e.g., values having an established order), such as values having nested hierarchies. For example, the ordered values may be time values (e.g., seconds, minutes, days, weeks, etc.), distance values (e.g., inches, feet, yards, etc.), etc. The collection of items may then be virtually any type of collection. As an example, a collection of items may be a collection of electronic issues of a magazine, wherein each issue has metadata associated with the issue such as a date, a topic, etc. As another example, a collection of items may be a collection of online movies, wherein each movie has metadata associated with the movie such as a title, director, release date, etc. As yet another example, the collection of items may be an electronic art collection, wherein each art item has metadata associated with the art item such as a title, artist, medium, date, etc. It can be appreciated that these examples are presented for the purpose of example, and are not intended to be limiting in any manner.

Continuing with FIG. 1, a collection of items may be stored locally on a computing device or may be stored remotely on a server computing device. For example, computing device 102 includes a collection, namely collection A, stored locally within a data-holding subsystem 104 of computing device 102. Computing device 102 may be configured to filter collection A to create a subset of collection A, depicted as subset A, as described in more detail hereafter. Likewise, server computing device 106 includes a collection, namely collection B, stored on a data-holding subsystem 108 of server computing device 106. Collection B may be accessed by another computing device, such as computing device 102 and/or computing device 110, via a network such as network 112. As depicted, computing device 110 filters collection B to create a subset of collection B, depicted as subset B, as described in more detail below. It will be understood that collections also may be stored in peer-to-peer networks, such that computing device 110 may search and filter collection A on computing device 102. It will further be understood that these embodiments are described for the purpose of example, and are not intended to be limiting in any manner.

Computing devices 102 and 110 each comprise a logic subsystem, shown at 116 and 118, respectively, configured to execute instructions stored in data-holding subsystems 104 and 114, respectively, to perform the embodiments related to filtering and display of collections of items described herein. Server computing device 106 also includes a logic subsystem 120 configured to execute instructions stored in data-holding subsystem 108 to search collection B and provide search results to a requesting client computing device. Computing device 102, computing device 110 and server computing device 106 may optionally include other components not shown in FIG. 1.

A logic subsystem (e.g., logic subsystem 116, logic subsystem 118, logic subsystem 120) may include one or more devices configured to execute one or more instructions. For example, a logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

A data-holding subsystem (e.g., data-holding subsystem 104, data-holding subsystem 114, data-holding subsystem 108) may include one or more physical devices, which may be non-transitory, and which are configured to hold data and/or instructions executable by the logic subsystem to implement the herein described methods and processes. When such methods and processes are implemented, the state of the data-holding subsystem may be transformed (e.g., to hold different data). The data-holding subsystem may include removable computer-readable media and/or built-in computer-readable media. The data-holding subsystem may include optical memory devices, semiconductor memory devices, and/or magnetic memory devices, among others. The data-holding subsystem may include devices with one or more of the following characteristics: volatile, nonvolatile, dynamic, static, read/write, read-only, random access, sequential access, location addressable, file addressable, and content addressable. In some embodiments, a logic subsystem and data-holding subsystem of a same computing device may be integrated into one or more common devices, such as an application specific integrated circuit or a system on a chip.

FIG. 1 also illustrates computer-readable removable media 122 and 124 which may be used to store and/or transfer data and/or instructions executable by computing devices 102 and 110, respectively, to implement the herein described methods and processes. Nonlimiting examples of computer-readable removable media 114 include a DVD, a CD, a disk, etc.

Computing device 102 and computing device 110 also each includes a display subsystem, shown at 126 and 128, respectively. With regard to computing device 102, display subsystem 126 may be used to present a visual representation of data held by data-holding subsystem 104. Likewise, with regard to computing device 110, display subsystem 128 may be used to present a visual representation of data held by data-holding subsystem 114. As the herein described methods and processes change the data held by the data-holding subsystem, and thus transform the state of the data-holding subsystem, the state of display subsystem may likewise be transformed to visually represent changes in the underlying data. The display subsystem may include one or more display devices utilizing virtually any type of technology. Such a display device may be combined with a logic subsystem and/or a data-holding subsystem in a shared enclosure, or such display devices may be peripheral display devices. A display subsystem may be configured to display user interface objects, such as user interface objects comprising frequency distributions. Further, a display subsystem may also be configured to display items in a results portion of the display, described in more detail below.

Figure 2:
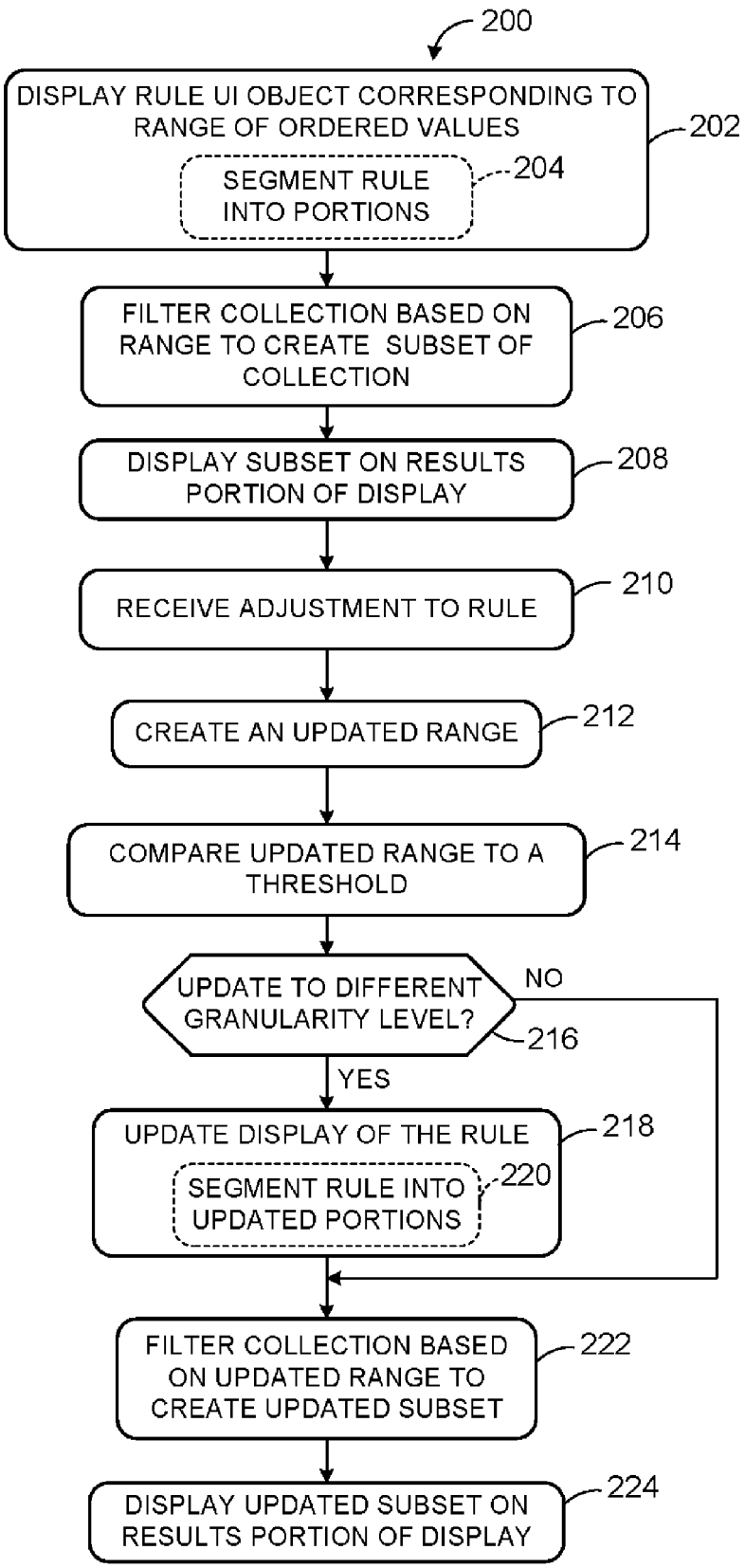
FIG. 2 shows a flow diagram of an example method of filtering a collection of items in accordance with an embodiment of the present disclosure.

FIG. 2 illustrates an embodiment of a method 200 of filtering a collection comprising a plurality of items. It will be understood that method 200 is performed via instructions executed by a computing system. Such instructions may be stored, for example, on a computer-readable storage medium (removable or otherwise) and/or in a data holding system of a computing device so that they are executable by the computing device. The collection of items may be stored on the same computing device performing method 200, or may be stored on another network-accessible computing device, such as that of a network-accessible server or peer. As an example, the collection of items may be stored within a database.

Each item of the collection comprises associated metadata. Such metadata may correspond to various categories and may have various associated values, including but not limited to ordered values. As such, the metadata can be used to filter the collection based on the ordered values. It will be understood that ordered values are values having an established order. Further, some ordered values may comprise values within nested hierarchies. As an example, the ordered values may be time values, where the nested hierarchies comprise, for example, seconds, minutes, days, weeks, months, years, etc. It will be understood that time values are one example of values within a nested hierarchy of values. As another example, the ordered values may be distance values (e.g., millimeter, centimeter, meter, kilometer, etc.), or even non-numerical values. It can be appreciated that these examples are presented for the purpose of example, and are not intended to be limiting in any manner.

At 202, method 200 includes displaying, on a display, a rule user interface object (e.g., a rule) corresponding to ordered values. The rule may define a range of ordered values defined between a first value and a second value. For example, a range of ordered values may be January-December, 1950-1960, 0-12 inches, etc. Further, the ordered values may be within a granularity level of a plurality of granularity levels within a nested hierarchy of values, and thus the range may be displayed at that granularity level. The ordered values may be associated with any suitable granularity level, including but not limited to the above-described examples, as well as extreme-order granularities, such as nanoscales, millennia, astronomical scales, etc.

The rule may further comprise marker user interface objects used to define the range. For example, the rule may include a first marker defining a first value and a second marker defining a second value, such that the range of ordered values is defined between the first value and the second value. As such, the markers may represent endpoints of the range. The markers may be moveable (e.g., via user selection) to other positions along the rule user interface object to vary the first value and the second value. As an example, the rule may be visually represented as a bar displaying the ordered values, and the markers may be visually represented as adjustable sliders that can be repositioned along the bar via drag-and-drop placement, for example. By dragging the endpoints farther apart, the range is increased. Likewise, by dragging the endpoints closer together, the range is decreased. Further, the range itself may be visually represented in any suitable manner, such as via coloring, shading, etc.

Further yet, in some embodiments, the markers may comprise additional user interface objects. As an example, a marker may include a user interface object selectable by a user to display a calendar user interface object of user-selectable dates. Any of the dates may then be selected to define the value associated with the marker.

At 204, method 200 may optionally include segmenting the rule into portions based on the granularity level associated with the range of ordered values. For example, if the granularity level is a daily granularity, then the rule may be segmented into portions, wherein each portion corresponds to a single day. As another example, if the granularity level is a meter granularity, then the rule may be segmented such that each portion corresponds to a single meter. Further, in some embodiments, the segments may be rendered so as to indicate whether or not they are associated with content. For example, a rule may be segmented into yearly segments for a range of 2008-2012. However, it's possible that the selected items may not include items associated with each of those years. As an example, there may not be any selected items with metadata having a value associated with 2010. In such a case, the 2010 segment may be rendered slightly transparent in comparison to the other segments, namely 2008, 2009, 2011, and 2012. Further yet, in some embodiments, segments not associated with content may be further disabled (e.g., not selectable via a mouse click).

Figure 3:
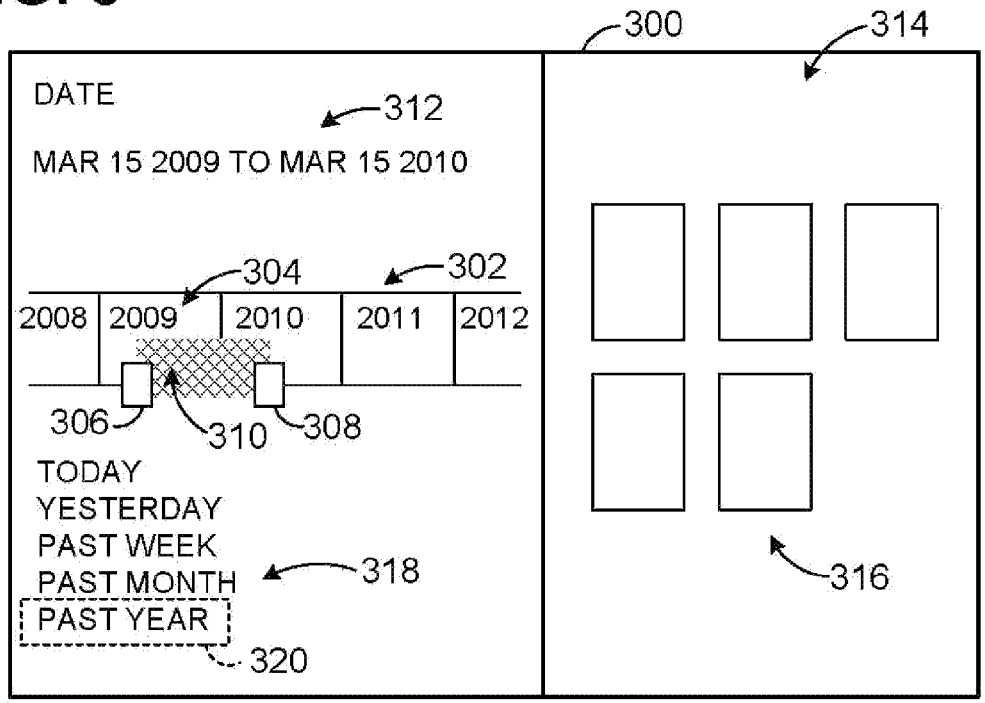
FIG. 3 shows a schematic depiction of an embodiment of a rule user interface object and a results portion of a display.
Figure 4:
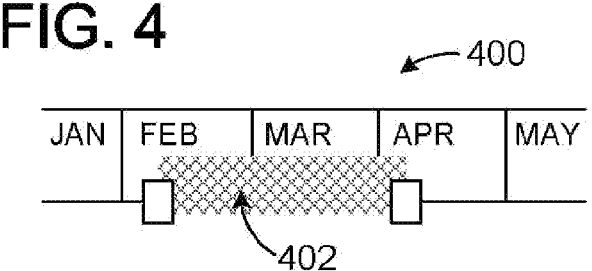
FIGS. 4-5 show schematic depictions of embodiments of a rule user interface object.
Figure 5:
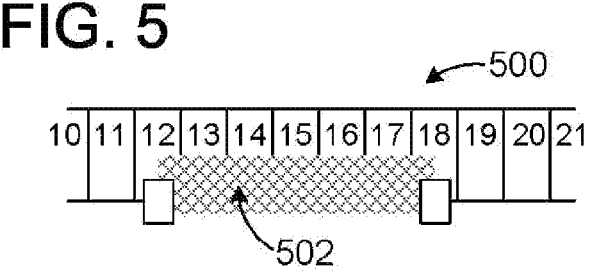

FIG. 3 shows an embodiment of an example user interface 300 displayed on a display, wherein the user interface 300 comprises a rule user interface object (e.g., rule) 302. In this example, rule 302 has a yearly granularity level, such that the rule 302 displays ordered years, namely 2008, 2009, 2010, 2011 and 2012. Further, rule 302 is segmented based on the yearly granularity level, such that each segment, such as example segment 304, corresponds to a year. FIG. 3 further displays example marker 306 and marker 308 defining a range 310. In the depicted example, marker 306 defines a lower endpoint of the range to be Mar. 15, 2009 and marker 308 defines an upper endpoint of the range to be Mar. 15, 2010. In some embodiments, a heading 312 may be displayed describing the range. As further examples, FIG. 4 shows another example rule 400 which has a monthly granularity and a range 402, and FIG. 5 shows another example rule 500 which has a daily granularity and a range 502. It can be appreciated that these examples are presented for the purpose of example, and are not intended to be limiting in any manner.

Returning to FIG. 2, at 206, method 200 includes filtering the collection based on the range of ordered values to create a subset of the collection of items. As such, the subset comprises one or more selected items, wherein each of the selected items has metadata corresponding to a value falling within the range of ordered values. At 208, method 200 includes displaying the subset of selected items on a results portion of the display. In other words, the range dictates which items of the subset are displayed in a results portion of the displayed user interface, which may occupy a different space on a display as the rule. Items may be displayed in the results portion in any suitable manner. For example, each item may be displayed as an image or icon representing that item. As an example, in the case of a collection of electronic magazines, each item (e.g., magazine) may be displayed in the results portion of the display as an image visually depicting the cover of that magazine. For the example depicted in FIG. 3, a results portion 314 of the display displays selected items 316 of the subset of the collection filtered based on the range 310 of rule 302.

Continuing with FIG. 2, at 210, method 200 includes receiving an adjustment to the rule user interface object. The adjustment updates the range of ordered values, described in more detail with reference to 212. The adjustment may be any suitable type of adjustment, for example, selected via a user input. In some embodiments, receiving the adjustment may comprise receiving an adjustment of the first marker and/or the second marker, which changes the first value and/or the second value, respectively. For example, where a computer mouse is used as a user input device, a user may make an adjustment to the rule by selecting a marker and performing a drag-and-drop operation to change the position of the marker along the rule.

In some embodiments, the aforementioned segmented portions of the rule may each be a selectable user interface object, in which case, the adjustment may comprise receiving a selection of one or more of the segmented portions selecting the different granularity level. For example, where a computer mouse is used as a user input device, a user may double-click on a month of a rule having a monthly granularity, to select an increased daily granularity where the rule is segmented into days of the selected month. As another example, multiple segments may be selected. For example, a user may select a first segment (e.g., via a click input), and then select another segment, for example, while holding the shift key, to select multiple segments. As an example, a user may click on a June segment of a rule having a monthly granularity, and then click on a December segment while holding the shift key, causing the selection of the June to December range.

As another example of an adjustment, the range visually presented on the rule may itself be a selectable user interface object. Accordingly, the adjustment may comprise selection of the range, adjusting the range to a different position along the rule. For example, the range may be visually represented by a shaded area between the two markers. Selection of that shaded area (e.g., via a drag and drop placement) may allow the user to change the position of the selection while maintaining the size of the selection. For example, with a range of June to December selected, the user can drag the range to the left by one month such that a range of May to November is now selected. As such, the range maintains the same span although the endpoints have changed.

Further, in some embodiments, the adjustment may comprise receiving a selection of a predetermined filter. The predetermined filter may comprise a numerical filter, such that selection of the predetermined filter applies the numerical filter to the items of the collection. The predetermined filter also may be described by a contextual term to provide a more user-friendly user interface. As such, the predetermined filters may aid a user in navigation, in that the filter can be selected to set a filter which updates the range, e.g., to an updated range spanning different values and/or an updated range having a different granularity. Examples of such predetermined filters include "Year," "Month," "Day," "Today," "Yesterday," etc. As an example, selection of a "Today" filter may adjust the range of the rule to correspond to today's date. FIG. 3 depicts example predetermined filters, at 318. In the depicted example, a predetermined filter of "Past Year" is selected, as indicated at 320.

Predetermined filters may also be provided that correspond to the collection of items being filtered. For example, if the collection is a collection of sports magazines, then predetermined filters may include "Baseball," "Football," "Cycling," "Snocross," etc. An example of a use scenario of predetermined filters is described in more detail with reference to FIG. 9.

At 212, method 200 includes in response to receiving the adjustment, updating the range of ordered values to create an updated range of ordered values based on the adjustment. For example, in the case of the adjustment being to one or more of the markers, the updated range is then the range between the new values defined by the markers. As another example, in the case of the adjustment being a selection of a single segment (e.g., January) of many segments, the range may then be updated to be defined between a starting value and ending value of the segment (e.g., January 01 to January 31). As yet another example, in the case of the adjustment being a selection of several segments (e.g., January-March), the range may then be updated to be defined between a starting value of the first segment and an ending value of the last segment (e.g., January 01 to March 31). As yet another example, in the case of the adjustment comprising a selection of a predetermined filter, the range may be updated to a range associated with that predetermined filter. For example, if the predetermined filter corresponds to "This Year" then the range may be updated to be January 2010-December 2010.

In some embodiments, the predetermined filter may be associated with a range of values even though the range may or may not be explicitly displayed. For example, in the case of the aforementioned example of sports magazines, selection of a predetermined filter of the sport "Snocross" may adjust the range from all years to a more recent range, such as 1990-present, since the sport is relatively new and there are thus no items in the collection corresponding to snocross prior to 1990.

At 214, upon creating the updated range, method 200 includes determining a comparison between the updated range of ordered values and a threshold. By doing so, it can be determined whether or not the granularity level of the rule is to be updated, as described in more detail as follows. The comparison may be done in any suitable manner. For example, the updated range may be compared to a first threshold and/or a second threshold. As an example, the updated range may be compared to a greater threshold. In such a case, a user may have adjusted the rule by dragging the markers apart, past a greater threshold, causing the rule to correspond to a different (e.g., next appropriate) granularity level. In the case of a greater threshold, the next appropriate granularity level may comprise a decreased granularity level. For example, the rule may originally be displaying six months of the year, and the range may originally be set to May-July. By dragging the right-hand slider to December, the range is now large enough to cause the rule to adjust to display a decreased granularity level, namely, the year level.

As another example, the updated range may be compared to a lesser threshold. For example, a user may have adjusted the rule by dragging the markers closer together, past a lesser threshold, causing the rule to correspond to a different (e.g., next appropriate) granularity level. In the case of a lower threshold, the next appropriate granularity level may comprise an increased granularity level. For example, the rule may originally be displaying six months of the year, and the range may originally be set to May-July. By dragging the right-hand slider to May, the range is now small enough to cause the rule to adjust to display an increased granularity level, namely, a daily level for the month of May.

Thresholds for triggering a change in granularity of the rule user interface object may be defined in any suitable manner. For example, in some embodiments, a threshold may be defined as a percentage of a length (or other quantity) of the displayed rule. In this case, a granularity level may be increased (e.g. a finer scale of units displayed) if the markers are close enough together as to be less than a lower percentage threshold level. Likewise, a granularity level may be decreased (e.g. a coarser scale of units displayed) if the markers are far enough apart as to be greater than an upper percentage threshold. In other embodiments, the thresholds may be defined by a number of units located between the markers at a current granularity scale. In this case, the thresholds may be defined separately for each granularity. It will be understood that these specific embodiments are presented for the purpose of example, and are not intended to be limiting in any manner.

Continuing with FIG. 2, if it is determined at 216 that the updated range corresponds to a different granularity level (e.g., the adjustment has triggered a different granularity level) then method 200 proceeds to 218, and includes, based on the comparison, updating display of the rule to display values associated with the different granularity level. The display of the rule may be updated in any suitable manner. As one example, the values may update immediately (e.g. without any transition state). As another example, an animation may be displayed of the rule user interface object updating (e.g., smoothly transitioning) from the range of time values to the updated range of time values associated with a different granularity level.

Further, updating display of the rule may further include segmenting the updated range of ordered values into updated portions based on the different granularity level, as indicated at 220. For example, if the rule is updating from a monthly granularity level having monthly segments to an increased daily granularity level, the updated rule may be then be segmented into daily segments.

Thus, in some embodiments, if the updated range of ordered values exceeds the first threshold (e.g., a greater threshold), then the updated range of ordered values may be segmented into updated portions based on a decreased granularity level associated with the updated range of ordered values. Likewise, in some embodiments, if the updated range of ordered values is less than the second threshold (e.g., a lesser threshold), then the updated range of ordered values may be segmented into updated portions based on an increased granularity level associated with the updated range of ordered values. Examples of use scenarios for such cases are described in more detail with reference to FIGS. 7 and 8, respectively.

Continuing with FIG. 2, method 200 next proceeds to 222. Likewise, if it was determined at 216 that the granularity has not changed to a different level based on the adjustment, method 200 proceeds directly from 216 to 222.

At 222, method 200 includes filtering the collection based on the updated range of ordered values to create an updated subset of selected items. As such, each selected item in the updated subset has metadata corresponding to a value falling within the updated range of ordered values.

At 224, method 200 includes displaying the updated subset of selected items on the results portion of the display. This may be done in any suitable manner. For example, an animation may be displayed of selected items being displayed in the results portion of the display. Likewise, an animation may be displayed on non-selected items (e.g., items having metadata corresponding to a value falling outside of the updated range of values) being removed from the results portion of the display.

It can be appreciated that as a user interface object, the rule may comprise additional user interface objects and/or be adjusted in various other manners. For example, the rule may be configured such that dragging the range to the edge of either side of the rule will cause the rule to scroll opposite that direction. As an example, for a rule having a yearly granularity, if the user drags the range from 2009 to 2010 and beyond, the rule may continue to advance to 2011, 2012, 2013.

Further, the rule may be configured to iterate past the values displayed on the rule, to display the next ordered values. For example, if a rule having a monthly granularity displays February through June, the rule may be further configured to display January preceding February, and July following June. Further yet, the next ordered values may be selectable such that selection causes the rule to advance to other ordered values in that direction of the ordering.

Figure 6:
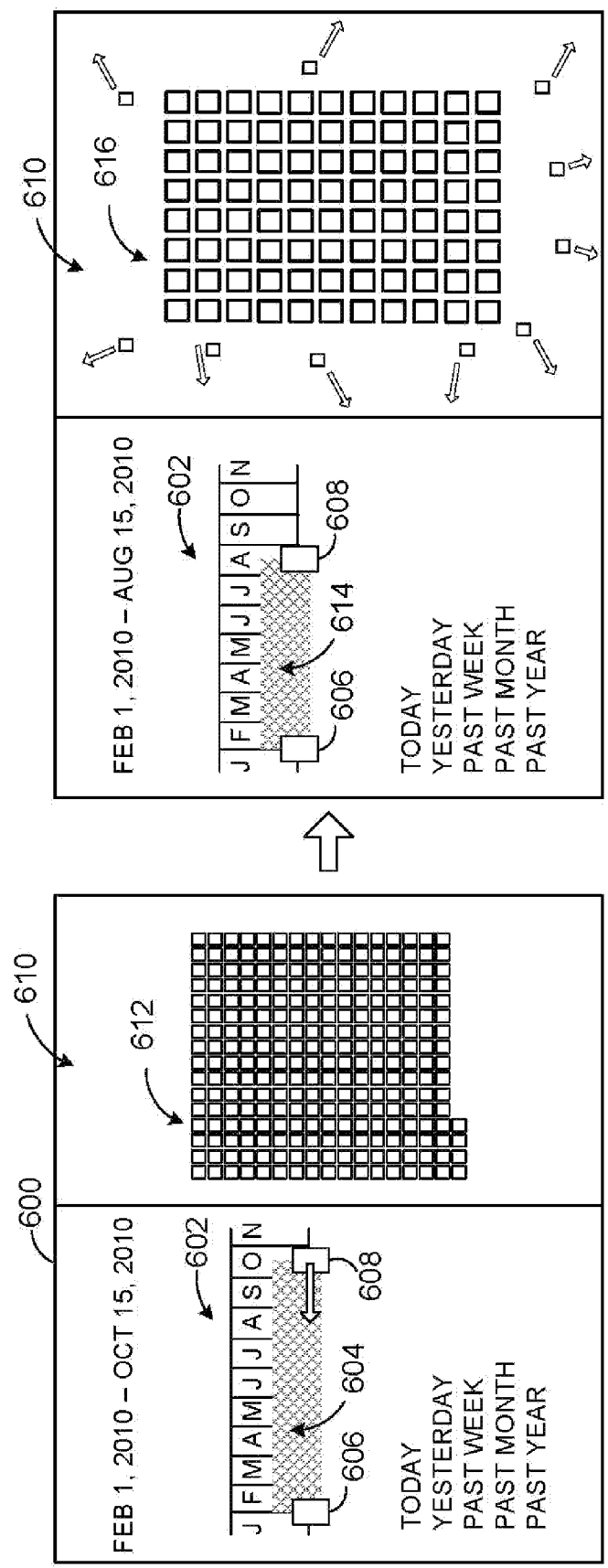
FIGS. 6-10 show schematic depictions of filtering a collection of a plurality of items in accordance with embodiments of the present disclosure.

Turning now to FIG. 6, a possible use scenario is illustrated for an embodiment of a user interface 600 comprising a rule 602. A range 604 of Feb. 1, 2010 to Oct. 15, 2010 is defined by markers 606 and 608. The results portion 610 of the display displays selected items 612 having metadata with values falling within range 604. Marker 608 is then adjusted to a different position along the rule 602 and selects a new value for the marker, namely Aug. 15, 2010. In response to this adjustment, the range then updates to an updated range 614 defined between Feb. 1, 2010 and Aug. 15, 2010, and rule 602 updates to display the updated range 614. Further, results portion 610 updates to display selected items of the collection filtered based on updated range 614. In this example, non-selected items have metadata with values falling outside of the updated range 614 are removed from the display (e.g., via animation) and selected items are displayed. In this example, a comparison was made between the updated range 614 and a threshold, and it was determined that rule 602 is not updated to a different granularity level. As such, the monthly granularity level remains.

Figure 7:
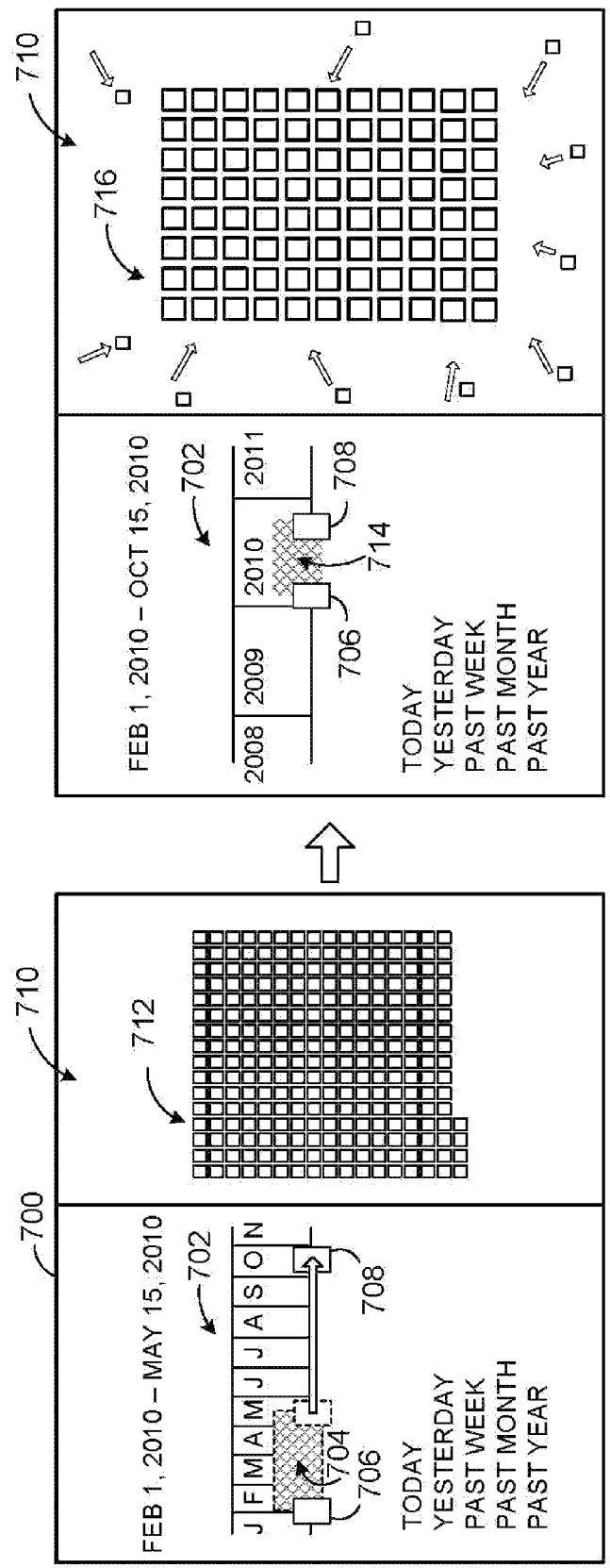

Turning now to FIG. 7, another possible use scenario is illustrated for an embodiment of a user interface 700 comprising a rule 702. A range 704 of Feb. 1, 2010 to May 15, 2010 is defined by markers 706 and 708. The results portion 710 displays selected items 712 having metadata with values falling within range 704. Marker 708 is then adjusted to a different position along the rule and selects a new value for the marker, namely Oct. 15, 2010. In response to this adjustment, the range then updates to updated range 714 defined between Feb. 1, 2010 and Oct. 15, 2010, and rule 702 updates to display the updated range 714. Further, results portion 710 has updated to display items selected items 716 based on updated range 714. In this example, the range increased such that some of the originally non-selected items now fall within the updated range 714. As such, those items are now included in the updated subset of selected items 716 filtered by the updated range 714. Accordingly, the selected items 716 are displayed (e.g., via an animation) on results portion 710. Further, FIG. 7 also illustrates a change in granularity level as a result of the user's input, such that rule 702 updates to display a different granularity level, namely a decreased granularity level. More specifically, the monthly granularity level updates to a yearly granularity, as depicted.

Figure 8:
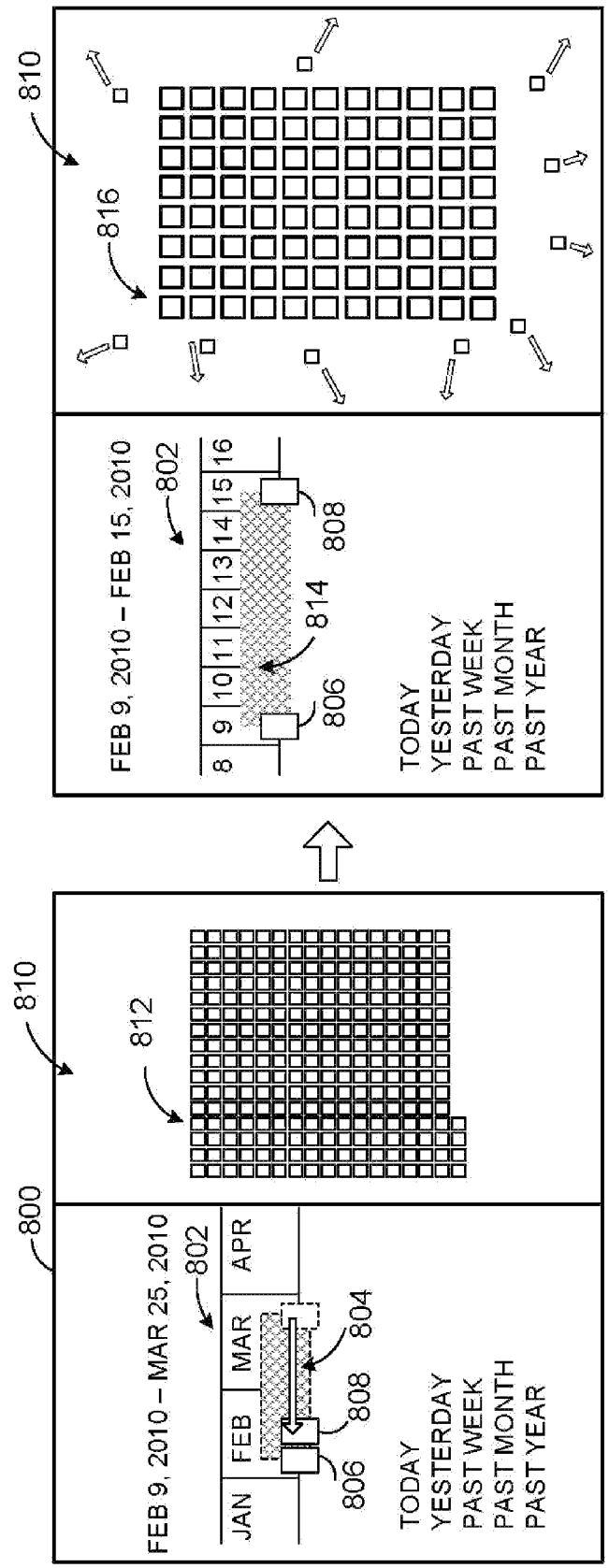

FIG. 8 illustrates another possible use scenario for an embodiment of a user interface 800 comprising a rule 802. A range 804 of Feb. 9, 2010 to Mar. 25, 2010 is defined by markers 806 and 808. The results portion 810 displays selected items 812 having metadata with values falling within range 804. Marker 808 is then adjusted to a different position along the rule and selects a new value for the marker, namely Feb. 15, 2010. In response to this adjustment, the range then updates to updated range 814 defined between Feb. 9, 2010 and Feb. 15, 2010, and rule 802 updates to display the updated range 814. Further, results portion 810 updates to display items selected based on updated range 814. In this example, the range decreased such that some of the originally selected items have metadata with values falling outside of the updated range 814. As such, those items are not included in the updated subset of selected items 816 filtered by the updated range 814. Accordingly, the non-selected items are removed from display (e.g., via an animation), and, selected items 816 having metadata with values within updated range 814 are displayed on results portion 810. Further, FIG. 8 also illustrates a change in granularity level as a result of the user's input, such that rule 802 updates to display a different granularity level, namely an increased granularity level. More specifically, the monthly granularity level updates to a daily granularity.

Figure 9:
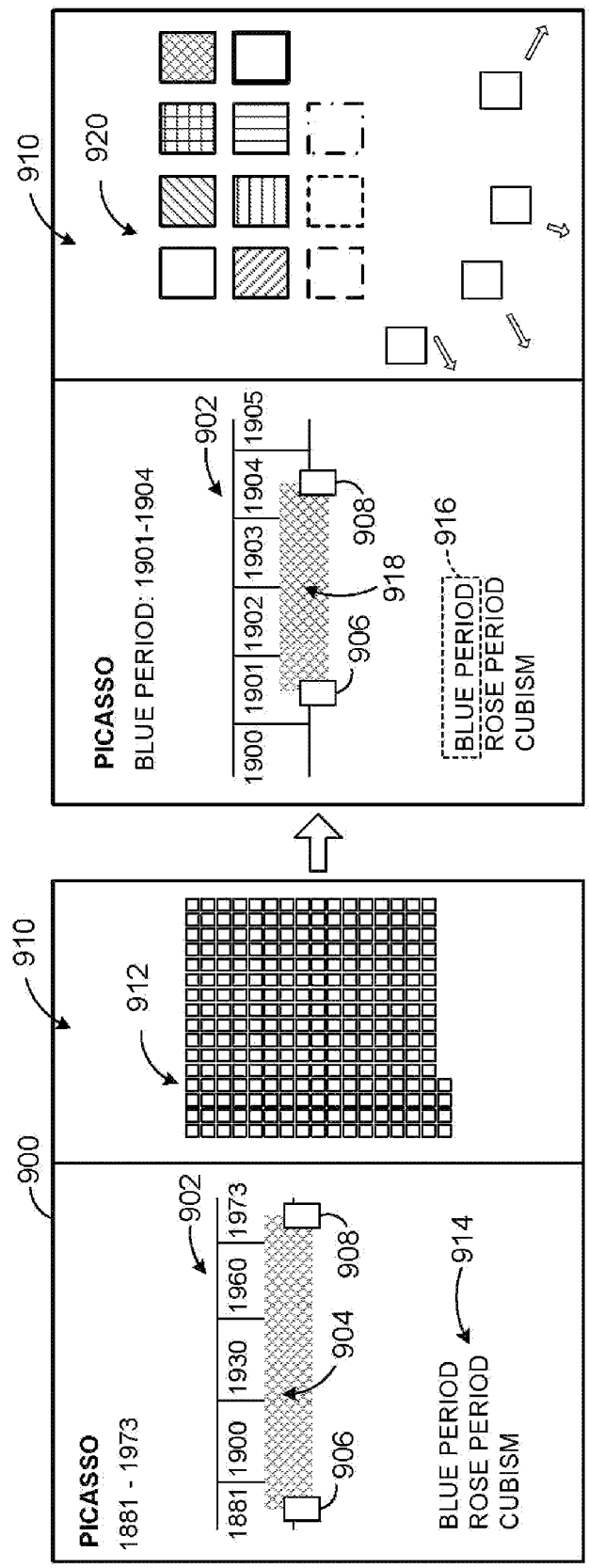

Turning now to FIG. 9, another possible use scenario is illustrated for an embodiment of a user interface 900 comprising a rule 902. A range 904 of Picasso's lifetime, namely 1881-1973, is defined by markers 906 and 908. The results portion 910 displays selected items 912 of a collection of Picasso's art. Each selected item 912 has metadata with values falling within range 904. In other words, selected items 912 may include all items of Picasso's entire career. The user interface further displays predetermined filters 914 corresponding to various periods during Picasso's career. Predetermined filter 916 is then selected, which corresponds to Picasso's Blue Period. In response to this adjustment, the range then updates to updated range 918 defined to be 1901-1904 by predetermined filter 916. Further, results portion 910 has updated to display selected items 920 based on updated range 918, namely Picasso's art from his Blue Period. In this example, the non-selected items (e.g., items from other periods of Picasso's career) are removed from the results portion of the display (e.g., via an animation). Further, FIG. 9 also illustrates a change in granularity level as a result of the user's input, such that rule 902 updates to display a different granularity level, namely an increased granularity level. More specifically, the multi-year granularity updates to a yearly granularity where each segment corresponds to a single year.

Figure 10:
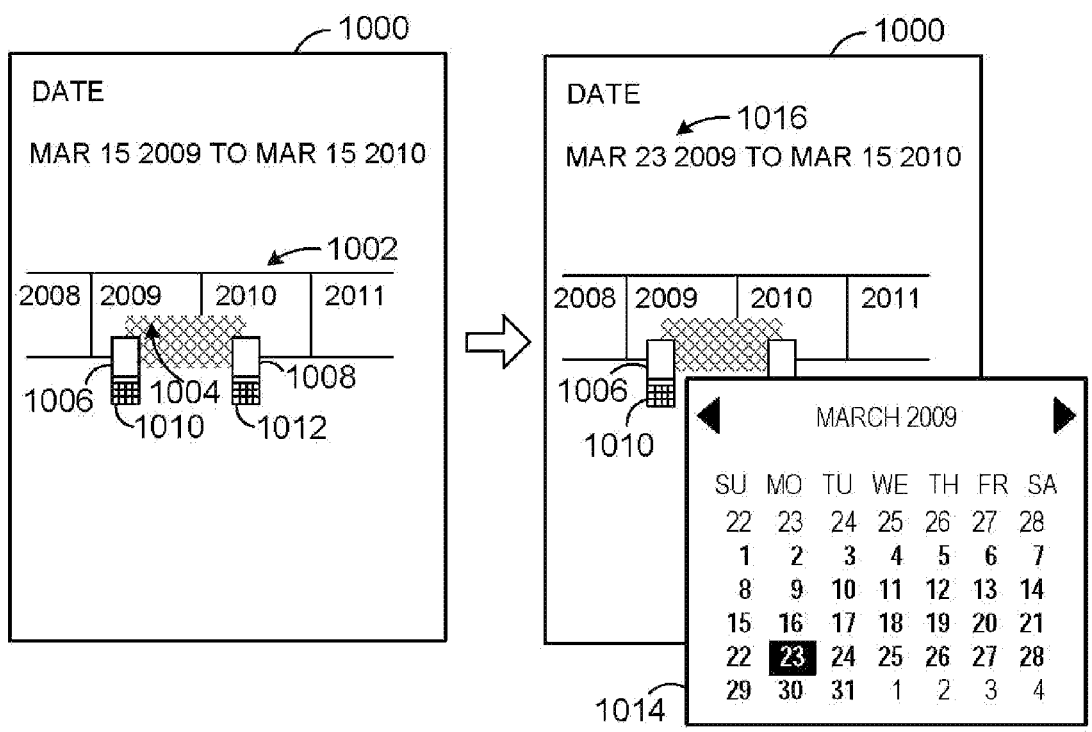

FIG. 10 illustrates another possible use scenario for an embodiment of a user interface 1000 comprising a rule 1002. A range 1004 is defined by markers 1006 and 1008 that further include selectable user interface objects 1010 and 1012, respectively. In the depicted embodiment, upon receiving selection of user interface object 1010, a calendar user interface object 1014 is displayed. Calendar user interface object 1014 provides dates which a user may select (e.g., via a mouse click) to select a new date value for marker 1006. For example, a user may select Mar. 23, 2009 (e.g., by clicking on "23") causing the range to update from Mar. 15, 2009-Mar. 15, 2010 to Mar. 23, 2009-Mar. 15, 2010, as depicted at 1016. It will be understood that the markers 1006 and 1008 may be configured to display any other suitable user interface objects than calendars upon selection.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of filtering a collection of items, each item having metadata corresponding to ordered values, the method comprising:
    displaying, on a display, a rule user interface object corresponding to ordered values associated with a granularity level, the rule user interface object comprising a first marker defining a first value and a second marker defining a second value, each of the first marker and the second marker being moveable to other positions along the rule user interface object to vary the first value and the second value, the first marker and the second marker defining a range of ordered values between the first value and the second value;
    filtering the collection based on the range of ordered values to create a subset of the collection, the subset comprising one or more selected items each having metadata corresponding to a value falling within the range of ordered values;
    displaying the subset of selected items on a results portion of the display; receiving an adjustment to the rule user interface object changing one or more of the first value and the second value, the adjustment defining an updated range of ordered values, different from the range of ordered values;
    in response to receiving the adjustment to the rule user interface object, compare the updated range of ordered values to one or more of a first threshold and a second threshold, the first threshold and the second threshold each defined as a ratio of a length of the displayed rule user interface object to a length of the updated range of ordered values;
    if the updated range of ordered values exceeds the first threshold, segment the updated range of ordered values into updated portions based on a decreased granularity level associated with the updated range of ordered values;
    if the updated range of ordered values is less than the second threshold, segment the updated range of ordered values into updated portions based on an increased granularity level associated with the updated range of ordered values;
    based on the comparison, updating display of the rule user interface object to display values associated with the different granularity level;
    filtering the collection based on the updated range of ordered values to create an updated subset of selected items; and
    displaying the updated subset of selected items on the results portion of the display.

2. The method of claim 1, wherein the threshold is a greater threshold, and wherein the different granularity level is a decreased granularity level.

3. The method of claim 1, wherein the threshold is a lesser threshold, and wherein the different granularity level is an increased granularity level.

4. The method of claim 1, wherein receiving the adjustment comprises receiving an adjustment of one or more of the first marker and the second marker.

5. The method of claim 1, wherein receiving the adjustment comprises receiving a selection of a predetermined filter.

6. The method of claim 5, wherein the predetermined filter comprises a numerical filter described by a contextual term.

7. The method of claim 1, wherein the range of ordered values is segmented into portions based on the granularity level, and wherein updating display of the rule user interface object comprises segmenting the updated range of ordered values into updated portions based on the different granularity level.

8. The method of claim 1, wherein the range of ordered values is segmented into portions based on the granularity level, each of the segmented portions being a selectable user interface object, and wherein receiving the adjustment comprises receiving a selection of one of the segmented portions selecting the different granularity level.

9. The method of claim 1, wherein the ordered values are time values.

10. The method of claim 1, wherein one or more of the first marker and the second marker further comprise a selectable user interface object for displaying a calendar user interface object of user-selectable dates, and wherein the adjustment comprises receiving selection of the calendar user interface object, in response displaying the calendar user interface object, and receiving selection of a date from the calendar user interface object, the date changing one or more of the first value and the second value.

11. A volatile or non-volatile memory comprising instructions stored thereon that are executable by a computing device to:
    display, on a display, a rule user interface object corresponding to a range of ordered values, the range of ordered values being segmented into portions based on a granularity level associated with the range of ordered values;
    filter a collection of items based on the range of ordered values to create a subset of the collection, the subset comprising one or more selected items each having metadata corresponding to a value falling within the range of ordered values;
    display the subset of selected items on a results portion of the display;
    receive an adjustment to the rule user interface object defining an updated range of ordered values corresponding to a portion of the range of ordered values;
    in response to receiving the adjustment to the rule user interface object, compare the updated range of ordered values to one or more of a first threshold and a second threshold, the first threshold and the second threshold each defined as a ratio of a length of the displayed rule user interface object to a length of the updated range of ordered values;

if the updated range of ordered values exceeds the first threshold, segment the updated range of ordered values into updated portions based on a decreased granularity level associated with the updated range of ordered values;

if the updated range of ordered values is less than the second threshold, segment the updated range of ordered values into updated portions based on an increased granularity level associated with the updated range of ordered values;

display the updated range of ordered values segmented into the updated portions;

filter the collection based on the updated range of ordered values to create an updated subset of selected items; and display the updated subset of selected items on the results portion of the display.

12. The volatile or non-volatile memory of claim 11, wherein the rule user interface object comprises a first marker defining a first value and a second marker defining a second value, each of the first marker and the second marker being moveable to other positions along the rule user interface object to vary the first value and the second value, and wherein the range of ordered values is defined between the first value and the second value.

13. The volatile or non-volatile memory of claim 12, wherein the instructions are configured to receive the adjustment by receiving an adjustment of one or more of the first marker and the second marker.

14. The volatile or non-volatile memory of claim 12, wherein each of the segmented portions is a selectable user interface object, and wherein the instructions are configured to receive the adjustment by receiving a selection of one of the segmented portions selecting a different granularity level.

15. The volatile or non-volatile memory of claim 12, wherein the instructions are configured to receive the adjustment by receiving a selection of a predetermined filter.

16. The volatile or non-volatile memory of claim 12, wherein the ordered values are time values.

17. A computing device, comprising:
a display;
a logic subsystem configured to execute instructions and to access a database comprising a collection of items, each item having metadata; and
a data-holding subsystem holding instructions executable by the logic subsystem to:
display, on the display, a rule user interface object defining a range of time values associated with a granularity level;
filter the collection based on the range of time values to create a subset of the collection, the subset comprising one or more selected items each having metadata corresponding to a time value falling within the range of time values;
display the subset of selected items on a results portion of the display;
receive an adjustment to the rule user interface object updating the range of time values to create an updated range of time values;
in response to receiving the adjustment to the rule user interface object, compare the updated range of ordered values to one or more of a first threshold and a second threshold, the first threshold and the second threshold each defined as a ratio of a length of the displayed rule user interface object to a length of the updated range of ordered values;
if the updated range of ordered values exceeds the first threshold, segment the updated range of ordered values into updated portions based on a decreased granularity level associated with the updated range of ordered values;
if the updated range of ordered values is less than the second threshold, segment the updated range of ordered values into updated portions based on an increased granularity level associated with the updated range of ordered values;
based on the comparison, display an animation of the rule user interface object updating from the range of time values to the updated range of time values associated with the different granularity level;
filter the collection based on the updated range of time values to create an updated subset of selected items;
display an animation of selected items having metadata corresponding to a time value falling within the updated range of time values being displayed in the results portion of the display; and
display an animation of non-selected items having metadata corresponding to a time value falling outside of the updated range of time values being removed from the results portion of the display.

18. The computing device of claim 17, wherein the rule user interface object comprises a first marker defining a first time value and a second marker defining a second time value, each of the first marker and the second marker being moveable to other positions along the rule user interface object to vary the first time value and the second time value, and wherein the range of time values is defined between the first time value and the second time value.

19. The computing device of claim 18, wherein the instructions are further executable to receive the adjustment by receiving one or more of a selection of a predetermined filter, an adjustment of the first marker and an adjustment of the second marker.

20. The computing device of claim 17, wherein the range of time values is segmented into portions based on the granularity level, each of the segmented portions being a selectable user interface object, and wherein the instructions are further executable to receive the adjustment by receiving a selection of one of the segmented portions.

* * * * *